United States Patent
Ohtomo et al.

(10) Patent No.: US 10,048,377 B2
(45) Date of Patent: Aug. 14, 2018

(54) POSTURE DETECTING DEVICE AND DATA ACQUIRING DEVICE

(71) Applicant: Kabushiki Kaisha TOPCON, Tokyo-to (JP)

(72) Inventors: Fumio Ohtomo, Saitama (JP); Kaoru Kumagai, Tokyo-to (JP); Kazuki Osaragi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 299 days.

(21) Appl. No.: 15/019,393

(22) Filed: Feb. 9, 2016

(65) Prior Publication Data
US 2016/0238708 A1 Aug. 18, 2016

(30) Foreign Application Priority Data
Feb. 16, 2015 (JP) ................................. 2015-027483

(51) Int. Cl.
*G01C 3/08* (2006.01)
*G01S 17/42* (2006.01)
(Continued)

(52) U.S. Cl.
CPC ............... *G01S 17/42* (2013.01); *G01C 9/06* (2013.01); *G01C 15/008* (2013.01); *G01C 2009/066* (2013.01)

(58) Field of Classification Search
CPC .. G01C 15/008; G01C 9/06; G01C 2009/066; G01S 17/42
(Continued)

(56) References Cited

U.S. PATENT DOCUMENTS 5,249,046 A 9/1993 Ulich et al.
8,857,069 B2 * 10/2014 Adegawa ................. G01C 9/00
33/291
(Continued)

FOREIGN PATENT DOCUMENTS

EP 2056066 A2 5/2009
JP 2007-248156 A 9/2007
(Continued)

OTHER PUBLICATIONS

"Fusion of Terrestrial LiDAR Point Clouds with Color Imagery," http://www.cis.rit.edu/DocumentLibrary/admin/uploads/CIS000202.PDF, May 16, 2013, Axel, et al.
(Continued)

*Primary Examiner* — Mark Hellner
(74) *Attorney, Agent, or Firm* — Nields, Lemack & Frame, LLC (57) ABSTRACT

The invention provides a posture detecting device, which comprises a tilt detecting unit as rotatably supported around two shafts perpendicular each other to an outer frame and for detecting a tilting from the horizontal, encoders provided on each of the shafts, motors provided so as to rotate each shaft, and a first arithmetic processing unit for driving/controlling the motor based on a detection result from the tilt detecting unit, wherein the first arithmetic processing unit drives the motors so that the tilt detecting unit detects the horizontal based on a signal from the tilt detecting unit when the outer frame is tilted and calculates a posture of the outer frame based on outputs of the encoders when the tilt detecting unit detects the horizontal.

4 Claims, 7 Drawing Sheets

(51) Int. Cl.
*G01C 15/00* (2006.01)
*G01C 9/06* (2006.01)

(58) Field of Classification Search
USPC .................................................. 356/4.01
See application file for complete search history.

(56) References Cited

U.S. PATENT DOCUMENTS

| | | | | |
|---|---|---|---|---|
| 2006/0242850 A1* | 11/2006 | Ammann | ............ | G01C 15/004 33/290 |
| 2008/0075326 A1* | 3/2008 | Otani | ................ | G01C 3/00 382/106 |
| 2008/0278715 A1* | 11/2008 | Swenson | ............... | G01S 7/4812 356/141.5 |
| 2012/0105923 A1 | 5/2012 | Mikkelsen et al. | | |
| 2012/0216413 A1* | 8/2012 | Adegawa | ................ | G01C 9/00 33/290 |
| 2013/0174432 A1 | 7/2013 | Kumagai et al. | | |
| 2013/0293681 A1 | 11/2013 | Borowski | | |
| 2016/0238385 A1 | 8/2016 | Ohtomo et al. | | |
| 2017/0227357 A1 | 8/2017 | Ohtomo et al. | | |

FOREIGN PATENT DOCUMENTS

| | | |
|---|---|---|
| JP | 4996371 B2 | 8/2012 |
| WO | 2004/099849 A1 | 11/2004 |
| WO | 2013/177650 A1 | 12/2013 |

OTHER PUBLICATIONS

European communication dated Jul. 8, 2016 in co-pending European patent application No. 16155684.0.
European communication dated Jul. 5, 2016 in corresponding European patent application No. 16155681.6.
Office action dated Feb. 15, 2018 in co-pending U.S. Appl. No. 15/019,360.
Notice of allowance dated May 31, 2018 in co-pending U.S. Appl. No. 15/019,360.

* cited by examiner

THE SAME DEFLECTION ANGLE

A AND A', B AND B' ARE ROTATED IN SYNCHRONIZATION

POSTURE DETECTING DEVICE AND DATA ACQUIRING DEVICE

BACKGROUND OF THE INVENTION

The present invention relates to a posture detecting device provided on a data acquiring device such as a surveying instrument, an image acquiring device and the like, requiring a posture detection and a data acquiring device provided with the posture detecting device.

As the data acquiring device for detecting a posture of the surveying instrument, for instance, for detecting a tilting with respect to the horizontal, a tilt sensor is known, for instance. Although the tilt sensor can detect the horizontal with high accuracy, responsiveness is poor and several seconds are required until the tilt sensor becomes stable. Further, in the tilt sensor, a measurement range is small, and a large tilting cannot be measured.

Further, as a sensor capable of detecting a tilting with high responsiveness, an acceleration sensor is known. Although a detection range is wider than the tilt sensor, detection accuracy is poor, and in order to set as an absolute reference such as the horizontal or the like, the detection accuracy does not satisfy a surveying level.

Further, in the conventional type, a posture detecting device has a limited range of detection of a tilt angle, and in all postures such as a case where the device is vertical or inverse or the like, the tilt angle cannot be detected.

SUMMARY OF THE INVENTION

It is an object of the present invention to provide a posture detecting device capable of detecting a tilt angle in all postures and a data acquiring device comprising the posture detecting device and capable of acquiring a data in all postures.

To attain the object as described above, a posture detecting device according to the present invention comprises a tilt detecting unit as rotatably supported around two shafts perpendicular each other to an outer frame and for detecting a tilting from the horizontal, encoders provided on each of the shafts, motors provided so as to rotate each shaft, and a first arithmetic processing unit for driving/controlling the motor based on a detection result from the tilt detecting unit, wherein the first arithmetic processing unit drives the motors so that the tilt detecting unit detects the horizontal based on a signal from the tilt detecting unit when the outer frame is tilted and calculates a posture of the outer frame based on outputs of the encoders when the tilt detecting unit detects the horizontal.

Further, in the posture detecting device according to the present invention, the tilt detecting unit comprises a first tilt sensor for detecting the horizontal with high accuracy and a second tilt sensor for detecting the tilting in a wider range and with a response at a higher speed than the first tilt sensor, wherein the second tilt sensor detects the tilting from the horizontal as detected by the first tilt sensor and wherein the first arithmetic processing unit is configured to calculate the posture of the outer frame based on a detection signal from the second tilt sensor.

Further, a data acquiring device according to the present invention comprises a light emitting element for emitting a distance measuring light, a distance measuring light projecting unit for projecting the distance measuring light, a light receiving unit for receiving a reflected distance measuring light, a photodetection element for receiving the reflected distance measuring light and for producing a photodetection signal and a distance measuring unit for performing a distance measurement based on a light receiving result from the photodetection element, further comprising the posture detecting device, a first optical axis deflecting unit disposed on a projection optical axis of the distance measuring light for deflecting an optical axis of the distance measuring light at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for detecting a deflection angle and a deflecting direction by the first optical axis deflecting unit, wherein it is so arranged that the distance measuring light is projected through the first optical axis deflecting unit and the reflected distance measuring light is received by the photodetection element through the second optical axis deflecting unit, and a three-dimensional data of a measuring point is obtained based on a distance measuring result of the distance measuring unit and a detection result of the projecting direction detecting unit, and the three-dimensional data is corrected based on the result detected by the posture detecting unit.

Furthermore, the data acquiring device according to the present invention further comprises a second arithmetic processing unit and an image pickup device having an image pickup optical axis in parallel and having a known relation with the projection optical axis, wherein the second arithmetic processing unit is configured so as to acquire an image with a three-dimensional data by associating a distance measuring result obtained by the distance measuring unit with the image acquired by the image pickup device.

According to the present invention, the posture detecting device comprises a tilt detecting unit as rotatably supported around two shafts perpendicular each other to an outer frame and for detecting a tilting from the horizontal, encoders provided on each of the shafts, motors provided so as to rotate each shaft, and a first arithmetic processing unit for driving/controlling the motor based on a detection result from the tilt detecting unit, wherein the first arithmetic processing unit drives the motors so that the tilt detecting unit detects the horizontal based on a signal from the tilt detecting unit when the outer frame is tilted and calculates an posture of the outer frame based on outputs of the encoders when the tilt detecting unit detects the horizontal. As a result, a tilt detection exceeding a measurement range of the tilt detecting unit can be performed and a posture detection can be performed in all postures.

Further, according to the present invention, in the posture detecting device, the tilt detecting unit comprises a first tilt sensor for detecting the horizontal with high accuracy and a second tilt sensor for detecting the tilting in a wider range and with a response at a higher speed than the first tilt sensor, wherein the second tilt sensor detects the tilting from the horizontal as detected by the first tilt sensor and wherein the first arithmetic processing unit is configured to calculate the posture of the outer frame based on a detection signal from the second tilt sensor. As a result, the posture detection with the response at a higher speed can be performed, installing on the moving body with many posture changes can be made, and further, the posture detection with high accuracy can be performed even under such condition that the posture detecting device is carried.

Further, according to the present invention, the data acquiring device comprises a light emitting element for emitting a distance measuring light, a distance measuring light projecting unit for projecting the distance measuring light, a light receiving unit for receiving a reflected distance measuring light, a photodetection element for receiving the reflected distance measuring light and for producing a photodetection signal and a distance measuring unit for performing a distance measurement based on a light receiving result from the photodetection element, further comprising the posture detecting device, a first optical axis deflecting unit disposed on a projection optical axis of the distance measuring light for deflecting an optical axis of the distance measuring light at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for detecting a deflection angle and a deflecting direction by the first optical axis deflecting unit, wherein it is so arranged that the distance measuring light is projected through the first optical axis deflecting unit and the reflected distance measuring light is received by the photodetection element through the second optical axis deflecting unit and a three-dimensional data of a measuring point is obtained based on a distance measuring result of the distance measuring unit and a detection result of the projecting direction detecting unit, and the three-dimensional data is corrected based on the result detected by the posture detecting unit. As a result, a highly accurate three-dimensional data as corrected the posture at an arbitrary measurement point can be acquired with a simple configuration.

Furthermore, according to the present invention, the data acquiring device further comprises a second arithmetic processing unit and an image pickup device having an image pickup optical axis in parallel and having a known relation with the projection optical axis, wherein the second arithmetic processing unit is configured so as to acquire an image with a three-dimensional data by associating a distance measuring result obtained by the distance measuring unit with the image acquired by the image pickup device. As a result, an image with a high accurate three-dimensional data as corrected the posture at the arbitrary measurement point at the data acquisition can be acquired.

DETAILED DESCRIPTION OF THE PREFERRED EMBODIMENT

A description will be given below on an embodiment of the present invention by referring to the attached drawings.

Figure 1:
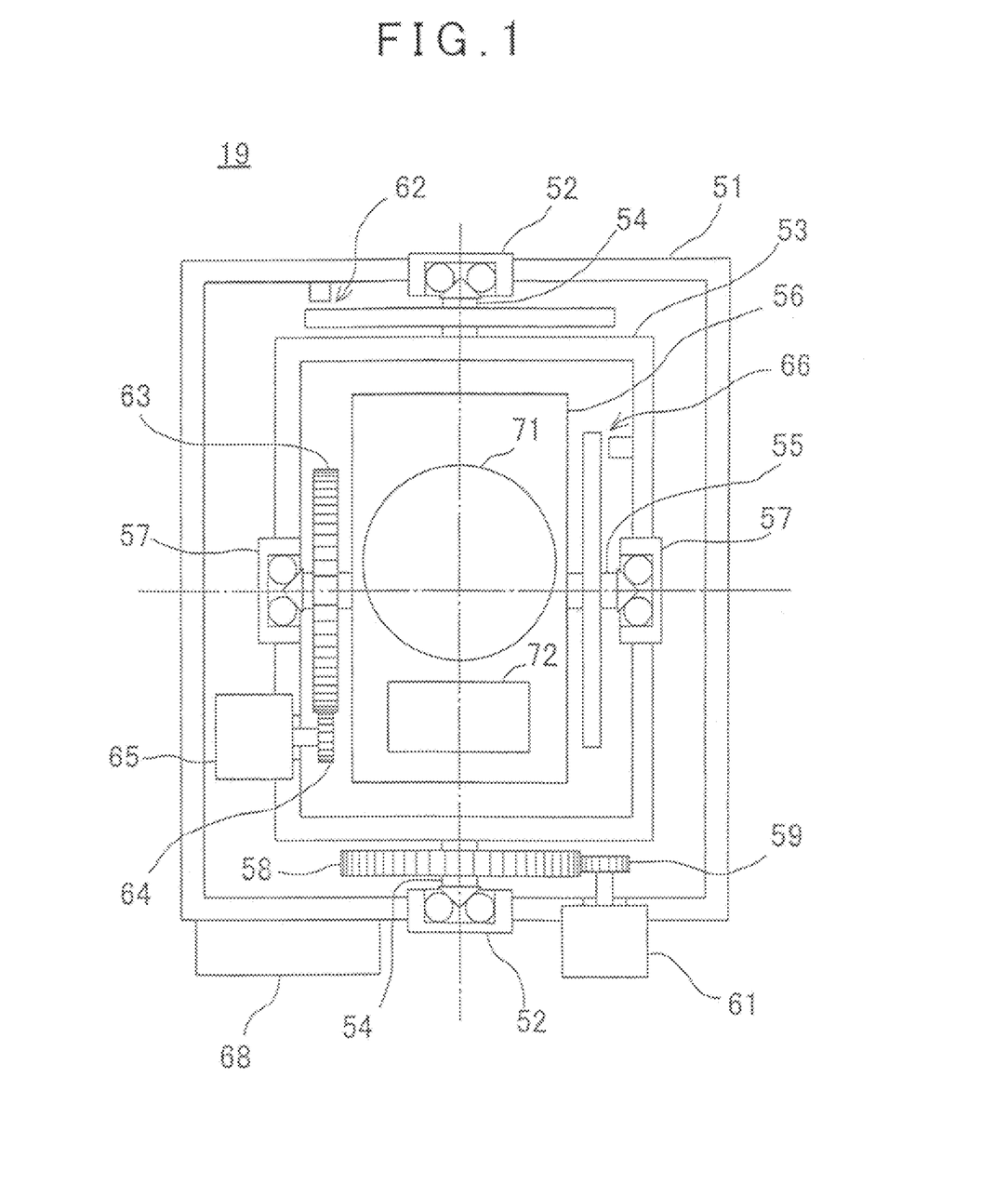
FIG. 1 is a schematical drawing of a posture detecting device according to an embodiment of the present invention.
Figure 2:
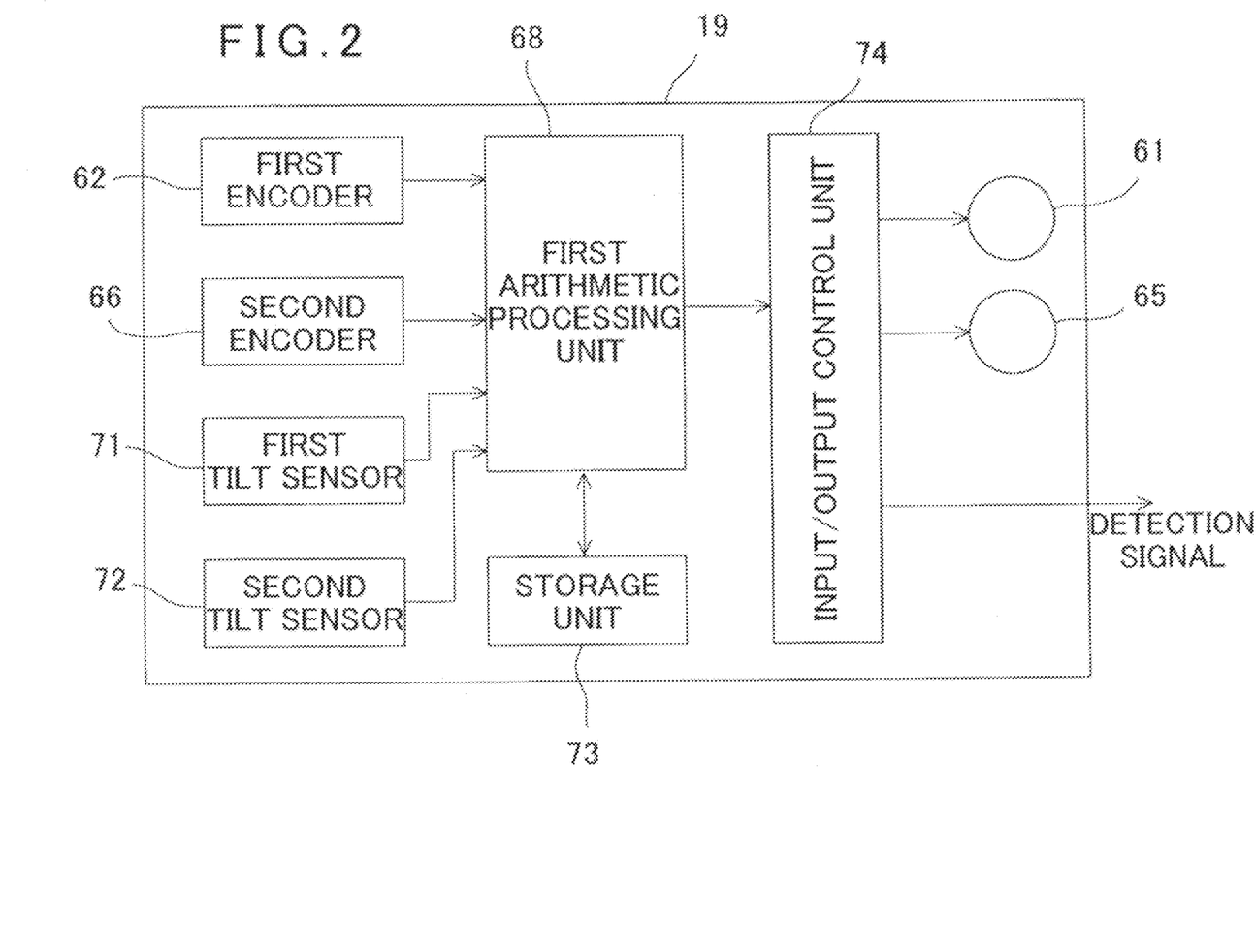
FIG. 2 is a schematical block diagram of the posture detecting device.

FIG. 1 and FIG. 2 are schematical drawings of a posture detecting device 19 according to the embodiment of the present invention.

Inside an outer frame 51 with a rectangular frame shape, an inner frame 53 with a rectangular frame shape is provided, and inside the inner frame 53, a tilt detecting unit 56 is provided.

In FIG. 1, from an upper surface and a lower surface of the inner frame 53, vertical shafts 54 and 54 are protruded, and the vertical shafts 54 and 54 are rotatably fitted with bearings 52 and 52 as provided on the outer frame 51. The vertical shafts 54 and 54 have a vertical axis, and the inner frame 53 is capable of rotating freely by 360° around the vertical shafts 54 and 54 as the center.

The tilt detecting unit 56 is supported by a horizontal shaft 55, and both end portions of the horizontal shaft 55 is rotatably fitted with bearings 57 and 57 provided on the inner frame 53. The horizontal shaft 55 has a horizontal axis perpendicular to the vertical axis, and the tilt detecting unit 56 is capable of rotating freely by 360° around the horizontal shaft 55 as the center.

The tilt detecting unit 56 is rotatably supported in two axial directions with respect to the outer frame 51, and a mechanism rotatably supporting the inner frame 53 and a mechanism rotatably supporting the tilt detecting unit 56 make up a gimbal mechanism. The tilt detecting unit 56 is supported via the gimbal mechanism with respect to the outer frame 51, and further, since there is no mechanism restricting the rotation of the inner frame 53, the tilt detecting unit 56 is configured to be freely rotatable in all directions with respect to the outer frame 51.

On one of the vertical shafts 54 and 54, for instance, a first driven gear 58 is fixed to the lower vertical shaft 54, and a first driving gear 59 meshes with the first driven gear 58. Further, a first motor 61 is provided on a lower surface of the outer frame 51, and the first driving gear 59 is fixed to an output shaft of the first motor 61.

On the other of the vertical shafts 54 and 54, a first encoder 62 is provided, and the first encoder 62 is configured so as to detect a rotation angle of the inner frame 53 with respect to the outer frame 51.

To one end portion of the horizontal shaft 55, a second driven gear 63 is fixed, and with the second driven gear 63, a second driving gear 64 meshes. Further, on a side left side in the figure) of the inner frame 53, a second motor 65 is provided, and the second driving gear 64 is fixed to an output shaft of the second motor 65.

On the other end portion of the horizontal shaft 55, a second encoder 66 is provided, and the second encoder 66 is configure so as to detect the rotation angle of the tilt detecting unit 56 with respect to the inner frame 53.

The first encoder 62 and the second encoder 66 are electrically connected to a first arithmetic processing unit 68.

The tilt detecting unit 56 has a first tilt sensor 71 and a second tilt sensor 72, and the first tilt sensor 71 and the second tilt sensor 72 are electrically connected to the first arithmetic processing unit 68.

Further description will be given on the posture detecting device 19 by referring to FIG. 2.

The posture detecting device 19 further comprises a storage unit 73 and an input/output control unit 74 in addition to the first encoder 62, the second encoder 66, the first tilt sensor 71, the second tilt sensor 72, the first arithmetic processing unit 68, the first motor 61 and the second motor 65.

In the storage unit 73, a program such as programs including a calculation program for a posture detection and the like, and data such as calculation data and the like are stored.

The input/output control unit 74 drives the first motor 61 and the second motor 65 based on a control instruction output from the first arithmetic processing unit 68 and outputs a result of a tilt detection calculated by the first arithmetic processing unit 68.

The first tilt sensor 71 is for detecting the horizontal with high accuracy, for instance, a tilt detector in which a detection light incidents to a horizontal liquid surface and the horizontal is detected according to a change of a reflection angle of the reflected light, or a bubble tube which detects a tilting according to a positional change of sealed air bubbles. Further, the second tilt sensor 72 is for detecting a tilt change with high responsiveness, for instance, an acceleration sensor.

Both the first tilt sensor 71 and the second tilt sensor 72 can individually detect a tilting in the two axial directions, which are a rotating direction (a tilting direction) detected by the first encoder 62 and a rotating direction (a tilting direction) detected by the second encoder 66.

The first arithmetic processing unit 68 calculates a tilt angle and a tilting direction based on detection results from the first tilt sensor 71 and the second tilt sensor 72, and further, calculates a rotation angle of the first encoder 62 and a rotation angle of the second encoder 66 corresponding to the tilt angle and the tilting direction.

In a case where the outer frame 51 is installed horizontally, the posture detecting device 19 is set such that the first tilt sensor 71 detects the horizontal, and further, is set such that an output of the first encoder 62 and an output of the second encoder 66 both indicate a reference position (rotation angle at 0°).

A description will be given below on an operation of the posture detecting device 19.

First, a description will be given below on a case where a tilting is detected with high accuracy.

As the case where a tilting is detected with high accuracy, there is a case where the posture detecting device 19 is provided on an installation-type surveying instrument, for instance.

When the posture detecting device 19 is tilted, the first tilt sensor 71 outputs a signal corresponding to a tilting.

The first arithmetic processing unit 68 calculates a tilt angle and a tilting direction based on the signal from the first tilt sensor 71 and further calculates rotation amounts of the first motor 61 and the second motor 65 in order to make the tilt angle and the tilting direction 0 based on a calculation result and outputs a driving command for driving the first motor 61 and the second motor 65 by the rotation amounts via the input/output control unit 74.

By driving of the first motor 61 and the second motor 65, the first motor 61 and the second motor 65 are driven so as to be tilted oppositely to the calculated tilt angle and the tilting direction, driving amounts (the rotation angles) of the motors are detected by the first encoder 62 and the second encoder 66 respectively, and when the rotation angles reach the calculation results, the drivings of the first motor 61 and the second motor 65 are stopped.

Further, the rotations of the first motor 61 and the second motor 65 are slightly adjusted so that the first tilt sensor 71 detects the horizontal.

In this state, under the condition where the outer frame 51 is tilted, the tilt detection unit 56 is controlled to the horizontal.

Therefore, in order to make the tilt detecting unit 56 horizontal, the tilt angles and the tilting directions, by which the inner frame 53 and the tilt detecting unit 56 are tilted by the first motor 61 and the second motor 65, are acquired based on the rotation angles as detected by the first encoder 62 and the second encoder 66.

The first arithmetic processing unit 68 calculates the tilt angle and the tilting direction of the posture detecting device 19 based on the detection results of the first encoder 62 and the second encoder 66 when the first tilt sensor 71 detects the horizontal. The calculation result indicates the posture after the posture detecting device 19 is tilted.

The first arithmetic processing unit 68 outputs the calculated tilt angle and the tilting direction to an outside as a detection signal of the posture detecting device 19.

Next, a description will be given on an operation of the posture detecting device 19 in a case where the posture detecting device 19 is provided on a device as carried and acquires a data under such condition that the posture detecting device 19 is carried.

Under such condition that the posture detecting device 19 is carried, the posture of the posture detecting device 19 changes every moment. Therefore, the posture detection is performed based on the detection result of the second tilt sensor 72 with high responsiveness.

First, if the control is so executed that a horizontal condition is detected by the first tilt sensor 71, a posture change after that is obtained by the second tilt sensor 72 with high responsiveness, and the posture detection is performed based on the detection result from the second tilt sensor 72, the tilting and the tilting direction of the posture detecting device 19 can be detected in real time.

Further, as a structure shown in FIG. 1, there is nothing which restricts rotations of the tilt detecting unit 56 and the inner frame 53, and the tilt detecting unit 56 and the inner frame 53 can both rotate by 360° or more. That is, no matter what posture the posture detecting device 19 takes (even in a case where the posture detecting device 19 is upside down, for instance), the posture detection in all directions can be performed.

Therefore, there is no limitation of the measurement range of the tilt sensor, and the posture detection can be performed in a wide range and in all postures.

In a case where high responsiveness is required, although the posture detection is performed based on the detection result of the second tilt sensor 72, the second tilt sensor 72 has poorer detection accuracy than the first tilt sensor 71 in general.

In the present embodiment, by comprising the first tilt sensor 71 with high accuracy and the second tilt sensor 72 with high responsiveness, the posture detection with high accuracy can be performed based on the detection result of the second tilt sensor 72 only.

Further, based on the tilt angle as detected by the second tilt sensor 72, the motor is driven so that the tilt angle becomes 0, and further, the driving of the motor is continued until the first tilt sensor 71 detects the horizontal. If a deviation occurs between a value of the encoder when the first tilt sensor 71 detects the horizontal, that is, an actual tilt angle and the tilt angle as detected by the second tilt sensor 72, the tilt angle of the second tilt sensor 72 can be calibrated based on the deviation.

Therefore, by obtaining a relation between the detected tilt angle of the second tilt sensor 72 and the tilt angle which is obtained based on the horizontal detection by the first tilt sensor 71 and the detection result of the encoder in advance, the tilt angle detected by the second tilt sensor 72 can be calibrated. Thereby, accuracy of the posture detection with high responsiveness by the second tilt sensor 72 can be improved.

The posture detecting device 19 according to the present invention can be applied to various devices. Particularly, the posture detecting device is useful if the posture detecting device is applied to a portable type device of which the posture is not stable.

By providing the posture detecting device 19 in a portable type image acquiring device, for instance, a tilting of the image acquiring device during the image pickup can be detected, and the acquired image can be easily converted to the horizontal posture.

Next, a description will be given below on an example of the data acquiring device comprising the posture detecting device 19 according to the present invention by referring to FIG. 3 to FIG. 7. As an example of the data acquiring device, a device acquiring a data with an image is shown below.

Figure 3:
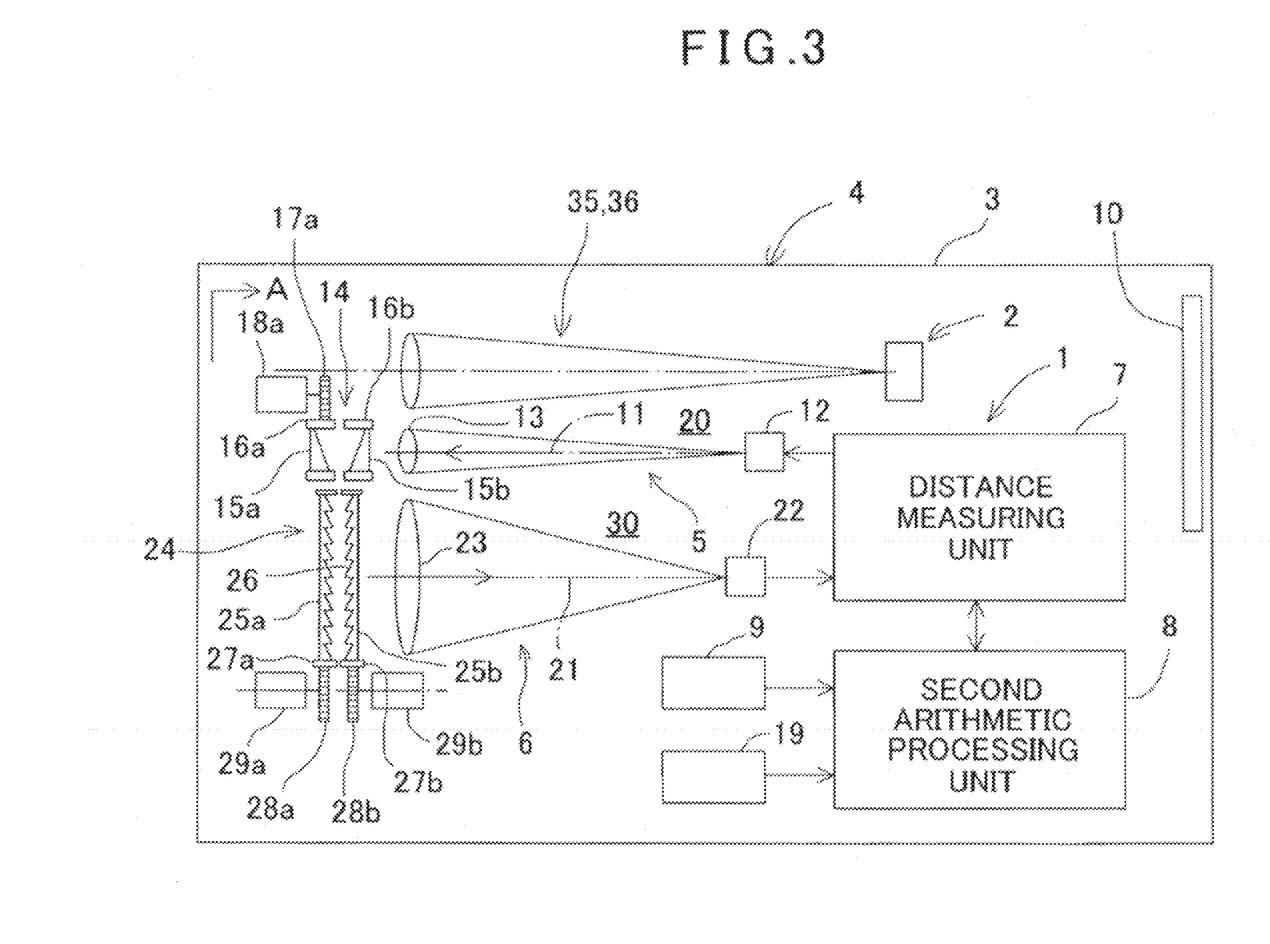
FIG. 3 is a schematical drawing of a data acquiring device according to an embodiment of the present invention.

In FIG. 3, reference numeral 1 denotes a surveying instrument, reference numeral 2 denotes an image pickup device and reference numeral 3 denotes a case for accommodating the surveying instrument 1 and the image pickup device 2. The surveying instrument 1 and the image pickup device 2 integrally make up a data acquiring device 4. The case 3 may be installed on a tripod or may be portable (handheld).

First, a description will be given on the surveying instrument 1.

The surveying instrument 1 has a distance measuring light projecting unit 5, a light receiving unit 6, a distance measuring unit 7, a second arithmetic processing unit 8, a projecting direction detecting unit 9, a display unit 10 and a posture detecting device 19.

The distance measuring light projecting unit 5 has a projection optical axis 11, a light emitting element, for instance, a laser diode (LD) 12 is provided on the projection optical axis 11, and further, a projecting lens 13 and a first optical axis deflecting unit 14 are disposed on the projection optical axis 11.

Further, a description will be given on the first optical axis deflecting unit 14.

On the projection optical axis 11, two first optical prisms 15a and 15b are provided, and each of the first optical prisms 15a and 15b is arranged rotatably around the projection optical axis 11 independently and individually. As to be descried later, the first optical prisms 15a and 15b deflect an optical axis of the distance measuring light projected from the projecting lens 13 in an arbitrary direction by controlling rotating directions, rotating amounts and rotating speeds of the first optical prisms 15a and 15b.

Materials of the first optical prisms 15a and 15b are preferably optical glass and the first optical prisms 15a and 15b are manufactured with high accuracy so as to have a same and known refractive index. By manufacturing the first optical prisms 15a and 15b with high accuracy, a luminous flux can be deflected to a predetermined direction without diffusing the distance measuring light, and further, an occurrence of distortion of a cross-section of a luminous flux or the like can be prevented, which enables a highly accurate distance measurement, and further, enables a long distance measurement.

Outer shapes of the first optical prisms 15a and 15b are circular with the projection optical axis 11 as the center respectively, a first ring gear 16a is fitted with an outer periphery of the first optical prism 15a and a first ring gear 16b is fitted with an outer periphery of the first optical prism 15b.

A first driving gear 17a meshes with the first ring gear 16a. The first driving gear 17a is fixed to an output shaft of a first motor 18a. Similarly, a first driving gear 17b meshes with the first ring gear 16b and the first driving gear 17b is fixed to an output shaft of a first motor 18b. The first motors 18a and 18b are electrically connected to the second arithmetic processing unit 8.

The first motors 18a and 18b are motors capable of detecting a rotation angle or motors which rotate corresponding to a driving input value, for instance, a pulse motor is used. Alternatively, a rotation detector for detecting a rotating amount of the motor such as an encoder or the like, for example, may be used for detecting the rotating amount of the motor.

The projecting direction detecting unit 9 counts driving pulses input to the first motors 18a and 18b and detects the rotation angles of the first motors 18a and 18b or detects the rotation angles of the first motors 18a and 18b based on signals from the encoders. Further, the projecting direction detecting unit 9 calculates rotation positions of the first optical prisms 15a and 15b based on the rotation angles of the first motors 18a and 18b, calculates deflection angle and a projecting direction of the distance measuring light based on the refractive indexes and the rotation positions of the first optical prisms 15a and 15b, and a calculation result is inputted to the second arithmetic processing unit 8.

Figure 4:
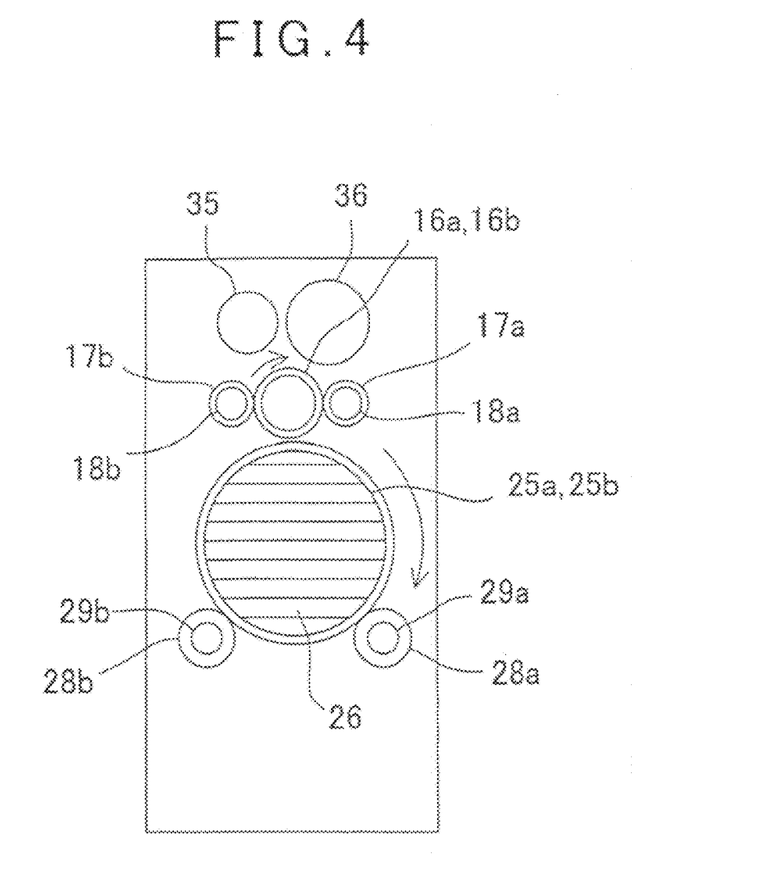
FIG. 4 is an arrow diagram A of FIG. 3.

In FIG. 3, the first driving gear 17a and the first motor 18a are shown on an upper side of the first ring gear 16a, but actually, the first driving gears 17a and 17b are provided at positions not interfering with a visual field of the image pickup device 2 as described later, at sides of the first ring gear 16a and 16b as shown in FIG. 4, for instance.

The projecting lens 13, the first optical prisms 15a and 15b or the like make up a projection optical system 20.

A description will be given on the light receiving unit 6. The light receiving unit 6 receives a reflected distance measuring light from an object. The light receiving unit 6 has a light receiving optical axis 21 and the light receiving optical axis 21 is in parallel with the projection optical axis 11.

On the light receiving optical axis 21, a photodetection element 22, for instance, a photodiode (PD) is provided, and the photodetection element 22 receives the reflected distance measuring light and produces a photodetection signal. Further, on an objective side of the light receiving optical axis 21, a light receiving lens 23 and a second optical axis deflecting unit 24 are disposed.

The second optical axis deflecting unit 24 has a pair of second optical prisms 25a and 25b on the light receiving optical axis 21 which are overlapped each other and arranged in parallel. As for the second optical prisms 25a and 25b, a Fresnel prism is preferably used respectively in order to reduce a size of the instrument.

The Fresnel prism used as the second optical prisms 25a and 25b is composed of a large number of prism elements 26 formed in parallel with each other and has a plate shape. Each of the prism elements 26 has the same optical characteristics and each of the prism elements 26 has the same refractive index and deflection angle as the first optical prisms 15a and 15b.

The Fresnel prism may be manufactured by an optical glass but may be molded by an optical plastic material. By molding the Fresnel prism by the optical plastic material, a low cost Fresnel prism can be manufactured.

Each of the second optical prisms 25a and 25b is arranged in such a manner that each of the second optical prism 25a and 25b rotates with the light receiving optical axis 21 as the center individually. Similarly to the first optical prisms 15a and 15b, the second optical prisms 25a and 25b deflect an optical axis of the reflected distance measuring light as the entered in an arbitrary direction by controlling rotating directions, rotating amounts and rotating speeds of the second optical prisms 25a and 25b.

Outer shapes of the second optical prisms 25a and 25b are circles with the light receiving optical axis 21 as the center, respectively, and taking an expansion of the reflected distance measuring light into consideration, diameters of the second optical prisms 25a and 25b are larger than the diameters of the first optical prisms 15a and 15b so that a sufficient light amount can be obtained.

A second ring gear 27a is fitted with an outer periphery of the second optical prism 25a and a second ring gear 27b is fitted with an outer periphery of the second optical prism 25b.

A second driving gear 28a meshes with the second ring gear 27a, and the second driving gear 28a is fixed to an output shaft of a second motor 29a. A second driving gear 28b meshes with the second ring gear 27b, and the second driving gear 28b is fixed to an output shaft of a second motor 29b. The second motors 29a and 29b are electrically connected to the second arithmetic processing unit 8.

As the second motors 29a and 29b, similarly to the first motors 18a and 18b, motors capable of detecting a rotation angle or motors which rotate corresponding to a driving input value, for instance, a pulse motor is used. Alternatively, a rotation detector for detecting a rotating amount (rotation angle) of the motor such as an encoder or the like, for example, may be used for detecting the rotating amount of the motor. The rotating amounts of the second motors 29a and 29b are detected and a synchronization control with the first motors 18a and 18b is carried out by the second arithmetic processing unit 8.

The second driving gears 28a and 28b and the second motors 29a and 29b are provided at positions not interfering with the distance measuring light projecting unit 5, for instance, on a lower side of the second ring gears 27a and 27b.

The second optical prisms 25a and 25b, the light receiving lens 23, or the like, make up a light receiving optical system 30.

The distance measuring unit 7 controls the light emitting element 12 and emits a laser beam as the distance measuring light. The reflected distance measuring light reflected from an object to be measured enters through the second optical prisms 25a and 25b and the light receiving lens 23 and is received by the photodetection element 22. The photodetection element 22 sends the photodetection signal to the distance measuring unit 7 and the distance measuring unit 7 performs distance measurement of a measuring point (a point where the distance measuring light is projected) based on the photodetection signal from the photodetection element 22.

The second arithmetic processing unit 8 is configured by an input/output control unit, an arithmetic unit (CPU), a storage unit, or the like. The storage unit stores programs such as a distance measuring program for controlling a distance measuring operation, a control program for controlling drivings of the first motors 18a and 18b and the second motors 29a and 29b, an image display program for displaying an image data, a distance measuring data, or the like, on the display unit 10, or the like, and further, in the storage unit, measurement results of the distance measuring data, the image data, or the like, are stored.

The posture detecting device 19 detects a posture with respect to the projection optical axis 11 of the distance measuring unit 7 and a posture (a tilt angle and a tilting direction) with respect to the horizontal of the data acquiring device 4. A detection result is inputted to the second arithmetic processing unit 8.

The image pickup device 2 has a wide-angle camera 35 and a narrow-angle camera 36, the wide-angle camera 35 has a wide-field angle, for instance 30°, while the narrow-angle camera 36 has a field angle narrower than the field angle of the wide-angle camera 35, for instance 5°. Further, it is preferable that the field angle of the narrow-angle camera 36 is equal to or slightly larger than a range to acquire a point cloud data (to be described later) obtained by the distance measuring light projecting unit 5.

Further, image pickup elements of the wide-angle camera 35 and the narrow-angle camera 36 are a CCD or a CMOS sensor which are an aggregate of pixels, and it is so arranged that a position of each pixel on an image element can be specified. For instance, the position of each pixel is specified by a coordinate system with an optical axis of each camera as an origin point.

The optical axis of the wide-angle camera 35 and the optical axis of the narrow-angle camera 36 are both parallel to the projection optical axis 11, and further, the optical axis of the wide-angle camera 35, the optical axis of the narrow-angle camera 36 and the projection optical axis 11 are in a known relation.

Figure 5A:
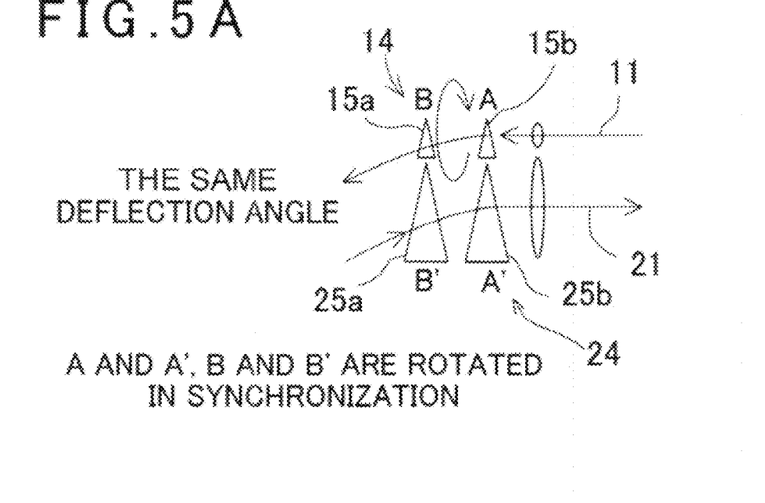
FIG. 5A, FIG. 5B, and FIG. 5C are drawings to explain an operation of first and second optical axis deflecting units.

First, a description will be given on a measurement operation by the surveying instrument 1 by referring to FIG. 5A and FIG. 5B. To simplify the explanation, in FIG. 5A, the second optical prisms 25a and 25b are shown as single prisms, respectively. Further, the first optical prisms 15a and 15b and the second optical prisms 25a and 25b as shown in FIG. 5A are in a state in which maximum deflection angles can be obtained. Further, the minimum deflection angle is a position where either one of the first optical prisms 15a and 15b and either one of the second optical prisms 25a and 25b are rotated by 180°, the deflection angle becomes 0°, and an optical axis of the laser beam as projected becomes parallel with the projection optical axis 11.

A distance measuring light is emitted from the light emitting element 12, the distance measuring light is turned to a parallel luminous flux by the projecting lens 13 and projected toward an object to be measured or a measurement target area through the first optical axis deflecting unit 14 (the first optical prisms 15a and 15b). Here, by passing through the first optical axis deflecting unit 14, the distance measuring light is deflected to a direction as required and projected by the first optical prisms 15a and 15b.

The reflected distance measuring light as reflected by the object to be measured or by the measurement target area is incident through the second optical axis deflecting unit 24 and is focused to the photodetection element 22 by the light receiving lens 23.

Since the reflected distance measuring light passes through the second optical axis deflecting unit 24, the optical axis of the reflected distance measuring light is deflected by the second optical prisms 25a and 25b so as to coincide with the light receiving optical axis 21 (FIG. 5A).

That is, the rotation positions, the rotating directions and the rotating speeds of the first optical prisms 15a and 15b and the second optical prisms 25a and 25b are synchronously controlled so that the first optical axis deflecting unit 14 and the second optical axis deflecting unit 24 have the same deflection angles at all times.

Specifically, the first motor 18a and the second motor 29a are synchronously controlled by the second arithmetic processing unit 8 so that the first optical prism 15a and the second optical prism 25a are deflected in the same direction at all times. Further, the first motor 18b and the second motor 29b are synchronously controlled by the second arithmetic processing unit 8 so that the first optical prism 15b and the second optical prism 25b are deflected in the same direction at all times.

Further, by a combination of the rotation positions of the first optical prism 15a and the first optical prism 15b, the deflecting direction and the deflection angle of distance measuring light to be projected can be arbitrarily deflected.

Further, under a condition where a positional relation between the first optical prism 15a and the first optical prism 15b is fixed (under a condition where the deflection angles obtained by the first optical prism 15a and the first optical prism 15b are fixed), by rotating the first optical prism 15a and the first optical prism 15b integrally, a locus drawn by the distance measuring light passing through the first optical axis deflecting unit 14 becomes a circle with the projection optical axis 11 as the center.

Therefore, by rotating the first optical axis deflecting unit 14 while emitting the laser beam from the light emitting element 12, the distance measuring light can be scanned by the locus of the circle.

It is to be noted that in this case also, it is needless to say that the second optical axis deflecting unit 24 rotates in the same direction at the same speed in synchronization with the first optical axis deflecting unit 14.

Figure 5B:
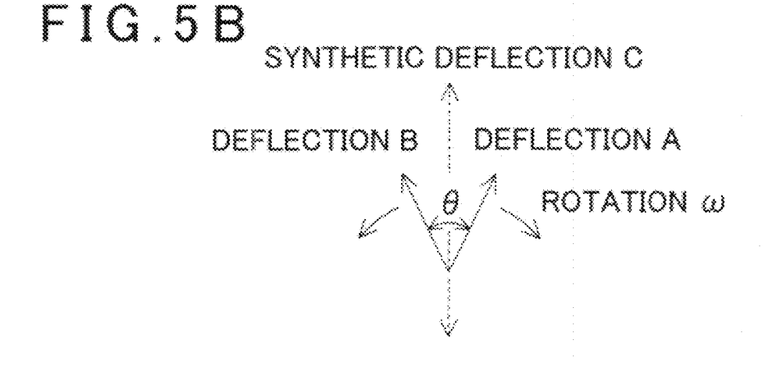

Next, FIG. 5B illustrates a case in which the first optical prism 15a and the first optical prism 15b are relatively rotated. Assuming that a deflecting direction of the optical axis as deflected by the first optical prism 15a is a deflection "A" and the deflecting direction of the optical axis as deflected by the first optical prism 15b is a deflection "B", the deflection of the optical axis by the first optical prisms 15a and 15b becomes a synthetic deflection "C" as an angle difference θ between the first optical prisms 15a and 15b.

Therefore, each time the angle difference θ is changed, by rotating the first optical axis deflecting unit 14 once, the distance measuring light can be scanned linearly.

Figure 5C:
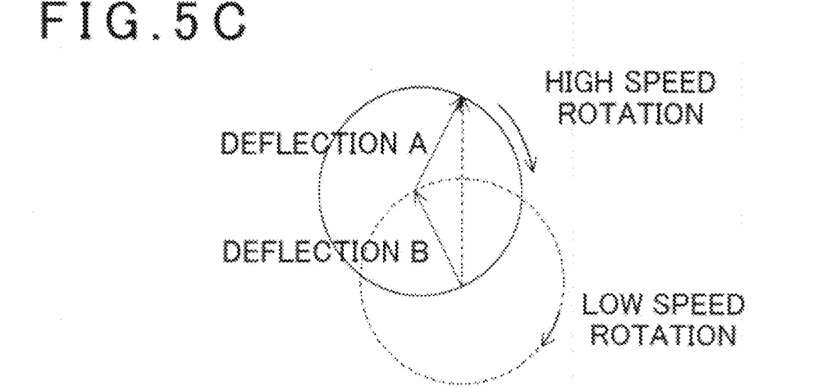

Further, as illustrated in FIG. 5C, when the first optical prism 15b is rotated at a rotating speed lower than the rotating speed of the first optical prism 15a, since the distance measuring light is rotated while the angle difference θ is gradually increased, the scanning locus of the distance measuring light becomes a spiral form.

Furthermore, by controlling the rotating direction and the rotating speed of the first optical prism 15a and the first optical prism 15b individually, the scanning locus of the distance measuring light is made in a radial direction (scanning in the radial direction) with the projection optical axis 11 as the center or in a horizontal direction or in a vertical direction or the like, and various scanning states can be obtained.

As a mode of measurement, by performing a distance measurement by fixing the first optical axis deflecting unit 14 and the second optical axis deflecting unit 24 per each deflection angle as required, the distance measurement can be performed with respect to a specific measuring point. Further, by executing the distance measurement while deflecting the deflection angles of the first optical axis deflecting unit 14 and the second optical axis deflecting unit 24, that is, by executing the distance measurement while scanning the distance measuring light, the point cloud data can be acquired.

Further, the projection directional angle of each distance measuring light can be detected by the rotation angles of the first motors 18a and 18b, and by associating the projection directional angle with the distance measurement data, the three-dimensional point cloud data can be acquired.

Further, a tilting of the projection optical axis 11 with respect to the horizontal can be detected by the posture detecting device 19. The point cloud data is corrected based on the tilting detected by the posture detecting device 19 and the point cloud data with high accuracy can be acquired. Therefore, even in a case where the data acquiring device 4 does not have a leveling function and cannot be installed horizontally, the point cloud data with high accuracy can be acquired.

Next, the three-dimensional data is acquired and the image data can also be acquired.

As described above, the image pickup device 2 has the wide-angle camera 35 and the narrow-angle camera 36.

The wide-angle camera 35 is primarily used for observation, and a wide-angle image acquired by the wide-angle camera 35 is displayed on the display unit 10.

A measuring operator searches an object to be measured from an image displayed on the display unit 10 or selects the object to be measured.

When the object to be measured is selected, the data acquiring device 4 is directed so that the object to be measured is captured by the narrow-angle camera 36. A narrow-angle image acquired by the narrow-angle camera 36 is displayed on the display unit 10. As a display method, the display of the wide-angle image by the wide-angle camera 35 and the display of the narrow-angle image by the narrow-angle camera 36 may be switched. Alternatively, the display unit 10 may be divided and display the narrow-angle image by the narrow-angle camera 36 on a divided portion or a window may be provided to display the narrow-angle image on the window.

Since the narrow-angle image acquired by the narrow-angle camera 36 is equal to or approximately equal to a measurement range of the surveying instrument 1, the measuring operator can visually specify the measurement range easily.

Further, since the projection optical axis 11 and the optical axis of the narrow-angle camera 36 are parallel, and both the optical axes are in a known relation, the second arithmetic processing unit 8 can match the image center with the projection optical axis 11 on the narrow-angle image by the narrow-angle camera 36. Further, by detecting the projection angle of the distance measuring light, the second arithmetic processing unit 8 can specify a measuring point on the image based on the projection angle. Therefore, an association between the three-dimensional data of the measuring point and the narrow-angle image can be performed easily, and the narrow-angle image as acquired by the narrow-angle camera 36 can be turned to an image with the three-dimensional data.

Figure 6A:
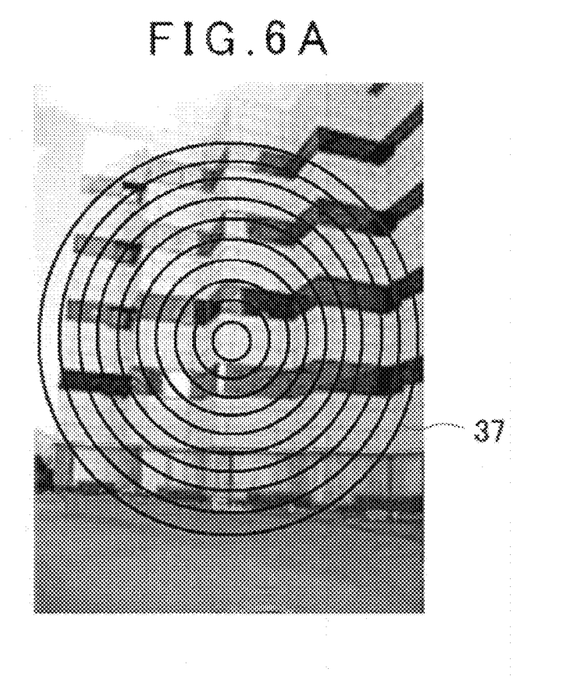
FIG. 6A and FIG. 6B are explanatory drawing for explaining a relation between an acquired image and a scanning locus.
Figure 6B:
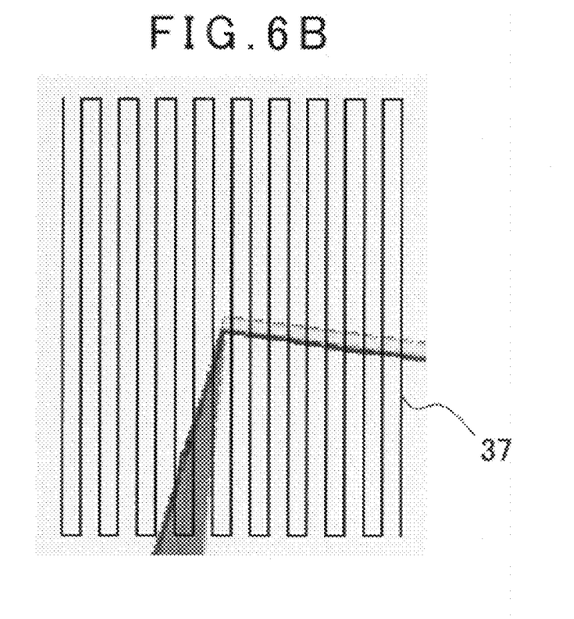

FIG. 6A and FIG. 6B show a relation between an image acquired by the narrow-angle camera 36 and an acquiring of the point cloud data. FIG. 6A shows a case in which the distance measuring light is scanned in a concentric and multi-circular form and FIG. 6B shows a case in which the distance measuring light is reciprocally scanned linearly. In the figure, reference numeral 37 denotes a scanning locus and the measuring points are positioned on the scanning locus.

Further, in a case where the measurement of a wide range is executed, the wide-angle image acquired by the wide-angle camera 35 is made the measurement range, the narrow-angle images acquired by the narrow-angle camera 36 are fitted into the wide-angle images like a patchwork and hence the measurement can be performed without a waste or without leaving an unmeasured portion.

Further, the data acquiring device 4 in the present embodiment comprises the posture detecting device 19.

The posture detecting device 19 is for detecting a posture of the data acquiring device 4 with respect to the horizontal, that is, a tilt angle and a tilting direction of the projection optical axis 11. In a case where the data acquiring device 4 is installed via a tripod, based on the detection result of the posture detecting device 19, the data acquiring device 4 is installed horizontally and the measurement can be performed under a condition where the data acquiring device 4 is horizontal. Therefore, a correcting operation such as correcting of a measured value by considering the tilting of the data acquiring device 4, or the like, is no longer needed.

In a case where the data acquiring device 4 is used under a carried condition (a handheld condition), the posture of the data acquiring device 4, when measurement is performed is detected by the posture detecting device 19, and the second arithmetic processing unit 8 corrects the measured value based on the tilt angle and the tilting direction as detected. Thereby, even under a condition close to a camera shake, the measurement as corrected with high accuracy becomes possible.

In the embodiment as described above, the second optical prisms 25a and 25b are made of the Fresnel prisms, but if there is a room, the second optical prisms 25a and 25b may be constituted by a single prism, respectively.

Figure 7:
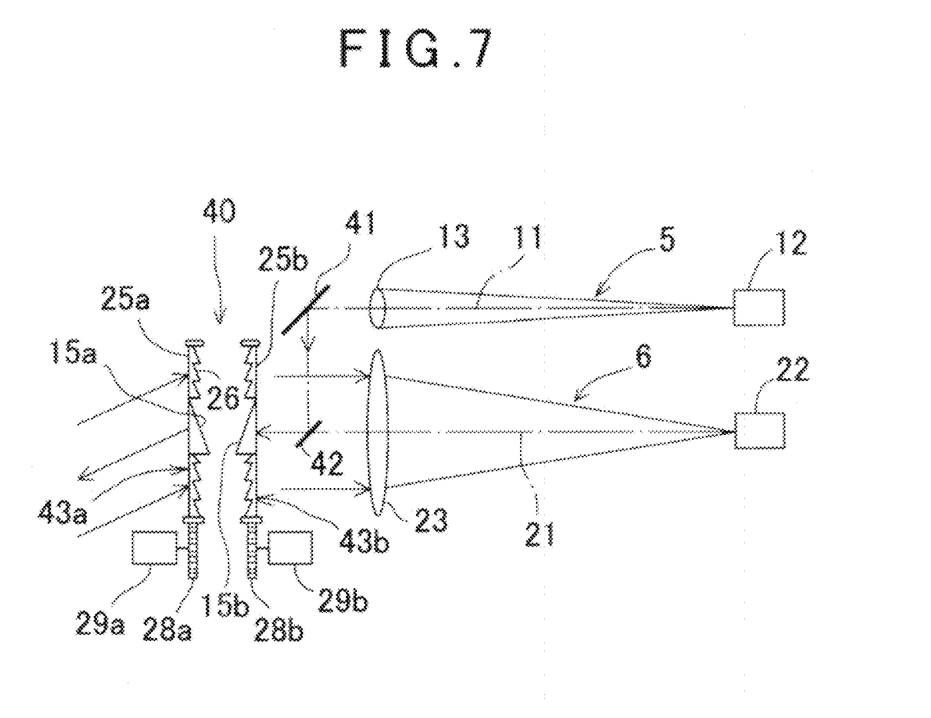
FIG. 7 is a schematical drawing to show an essential part of another embodiment.

FIG. 7 shows another embodiment.

In the another embodiment, the first optical axis deflecting unit 14 and the second optical axis deflecting unit 24 in the embodiment as described above are integrated as an optical axis deflecting unit 40. It is to be noted that in FIG. 7, what are equivalent to components as shown in FIG. 3 are referred by the same symbol.

A first reflection mirror 41 as a deflecting optical member is provided on a projection optical axis 11 of a distance measuring light projecting unit 5. Further, a second reflection mirror 42 as the deflecting optical member is faced with the first reflection mirror 41 and disposed on a light receiving optical axis 21. Further, the first reflection mirror 41 and the second reflection mirror 42 are set with a positional relation so that the projection optical axis 11 as deflected by the first reflection mirror 41 and the second reflection mirror 42 coincides with a light receiving optical axis 21 of a light receiving unit 6. The first reflection mirror 41 and the second reflection mirror 42 make up the projection optical axis deflecting unit.

It is to be noted that a size of the second reflection mirror 42 will suffice if the size is enough to reflect a distance measuring light. Therefore, since a luminous flux diameter of the distance measuring light is smaller, the size of the second reflection mirror 42 may be smaller. Since a luminous flux diameter of the reflected measuring light is larger, a light amount of the reflected distance measuring light as intercepted by the second reflection mirror 42 is small and does not exert influence on the distance measurement.

The optical axis deflecting unit 40 has circular-shaped combined optical prisms 43a and 43b disposed in parallel on the light receiving optical axis 21.

Since the combined optical prisms 43a and 43b have similar structure, a description will be given below on the combined optical prism 43a.

The combined optical prism 43a is composed of a second optical prism 25a and a first optical prism 15a.

The second optical prism 25a is a Fresnel prism in which a large number of prism elements 26 are formed, and at a central portion of the Fresnel prism, the prism element 26 is cut out circularly, the first optical prism 15a is provided at the central portion, and the second optical prism 25a and the first optical prism 15a are integrated. Further, the directions of the prism elements 26 of the first optical prism 15a and the second optical prism 25a are coincided with each other.

The first optical prism 15a and the second optical prism 25a are made of an optical plastic material and may be integrally molded by molding or it may be so designed that the second optical prism 25a is molded and a prism (the first optical prism 15a) manufactured by an optical glass is attached to the second optical prism 25a.

A distance measuring light emitted from a light emitting element 12 turned to a parallel luminous flux by a projecting lens 13 and is deflected by the first reflection mirror 41 and the second reflection mirror 42 so as to be projected along the light receiving optical axis 21.

Since the distance measuring light passes through the central portion of the combined optical prisms 43a and 43b, that is, the first optical prisms 15a and 15b, the distance measuring light is deflected to a direction as required and an angle as required, and projected.

Further, the reflected distance measuring light as reflected by the object to be measured passes through the second optical prisms 25a and 25b portions of the combined optical prisms 43a and 43b, is deflected so as to be in parallel with the light receiving optical axis 21, received by the photodetection element 22 and distance measurement is performed based on the light receiving result of the photodetection element 22.

In this another embodiment, since the first optical axis deflecting unit 14 is omitted, the structure is further simplified.

Further, motors used in a deflecting unit can be only the second motors 29a and 29b and controlling of the motors are also simplified.

As described above, in the data acquiring device according to the present invention, a point cloud data can be easily acquired by a simple structure. Further, in a case where an image is to be acquired at the same time, since an optical axis of an image pickup device coincides with a distance measuring optical axis (or in a parallel and known relation), association between the image and the point cloud data can be performed easily and the image with a three-dimensional data can be acquired easily.

Further, by comprising the posture detecting device according to the present invention, a correction and a modification of a tilting can be performed easily, and it becomes possible to acquire a data with high accuracy under such the condition that the posture detecting device is carried. Further, in the posture detecting device according to the present invention, since there is no limitation on the detection range of the tilt angle and it is possible to detect all directions and all postures, even in a case where the posture detecting device is equipped on a flying vehicle of which the posture is largely changed, the posture can be accurately detected, and a correction of the acquired data is also easy.

The invention claimed is:

1. A posture detecting device comprising; an inner frame as rotatably supported by 360° around vertical shafts by an outer frame, a tilt detecting unit as rotatably supported by 360° around a horizontal shaft perpendicular to said vertical shafts by said inner frame and for detecting a tilting from the horizontal, encoders provided on each of said shafts, motors provided so as to rotate each shaft, and a first arithmetic processing unit for driving/controlling said motor based on a detection result from said tilt detecting unit, wherein said first arithmetic processing unit drives said motors so that said tilt detecting unit detects the horizontal based on a signal from said tilt detecting unit when said outer frame is tilted and calculates a posture of said outer frame based on outputs of said encoders when said tilt detecting unit detects the horizontal.

2. The posture detecting device according to claim 1, wherein said tilt detecting unit comprises a first tilt sensor for detecting the horizontal with high accuracy and a second tilt sensor for detecting the tilting in a wider range and with a response at a higher speed than said first tilt sensor, wherein said second tilt sensor detects the tilting from the horizontal as detected by said first tilt sensor and wherein said first arithmetic processing unit is configured to calculate the posture of said outer frame based on a detection signal from said second tilt sensor.

3. A data acquiring device comprising; a light emitting element for emitting a distance measuring light, a distance measuring light projecting unit for projecting said distance measuring light, a light receiving unit for receiving a reflected distance measuring light, a photodetection element for receiving the reflected distance measuring light and for producing a photodetection signal and a distance measuring unit for performing a distance measurement based on a light receiving result from said photodetection element, further comprising said posture detecting device according to claim 1 or 2, a first optical axis deflecting unit disposed on a projection optical axis of said distance measuring light for deflecting an optical axis of said distance measuring light at a deflection angle as required and in a direction as required, a second optical axis deflecting unit disposed on a light receiving optical axis for deflecting the reflected distance measuring light at the same deflection angle and in the same direction as said first optical axis deflecting unit and a projecting direction detecting unit for detecting a deflection angle and a deflecting direction by said first optical axis deflecting unit, wherein it is so arranged that said distance measuring light is projected through said first optical axis deflecting unit and said reflected distance measuring light is received by said photodetection element through said second optical axis deflecting unit and a three-dimensional data of a measuring point is obtained based on a distance measuring result of said distance measuring unit and a detection result of said projecting direction detecting unit, and said three-dimensional data is corrected based on the result detected by said posture detecting unit.

4. The data acquiring device according to claim 3, further comprising a second arithmetic processing unit and an image pickup device having an image pickup optical axis in parallel and having a known relation with said projection optical axis, wherein said second arithmetic processing unit is configured so as to acquire an image with a three-dimensional data by associating a distance measuring result obtained by said distance measuring unit with the image acquired by said image pickup device.

* * * * *